United States Patent
Morimoto

(10) Patent No.: US 6,683,671 B1
(45) Date of Patent: Jan. 27, 2004

(54) LIQUID CRYSTAL DISPLAY DEVICE WITH SPACERS ON COLOR FILTERS OUTSIDE DISPLAY AREA AND METHOD OF MANUFACTURING THE SAME

(75) Inventor: Hirokazu Morimoto, Ibo-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 155 days.

(21) Appl. No.: 09/612,277

(22) Filed: Jul. 7, 2000

(30) Foreign Application Priority Data

Jul. 9, 1999 (JP) .......................................... 11-196209

(51) Int. Cl.[7] .......................................... G02F 1/1339
(52) U.S. Cl. ....................................................... 349/155
(58) Field of Search ........................................... 349/155

(56) References Cited

U.S. PATENT DOCUMENTS 5,978,061 A * 11/1999 Miyazaki et al. ........... 349/155

* cited by examiner

*Primary Examiner*—Robert H. Kim
*Assistant Examiner*—Timothy Rude
(74) *Attorney, Agent, or Firm*—Pillsbury Winthrop LLP

(57) ABSTRACT

Spacers are provided on the counter substrate side. Each of the spacers in the display area is provided on a counter electrode that covers a color filter layer of a given thickness formed on a light shield layer formed on a glass substrate. A spacer in the peripheral area adjacent the display area is formed on a dummy color filter layer of the given thickness formed a light shield layer on the glass substrate. The thickness of the counter electrode is negligibly small in comparison with the thickness of the color filter layer. The uniformity of cell gap can be achieved over the display area and the peripheral area.

8 Claims, 2 Drawing Sheets

LIQUID CRYSTAL DISPLAY DEVICE WITH SPACERS ON COLOR FILTERS OUTSIDE DISPLAY AREA AND METHOD OF MANUFACTURING THE SAME

CROSS-REFERENCE TO RELATED APPLICATIONS

This application is based upon and claims the benefit of priority from the prior Japanese Patent Application No. 11-196209, filed Jul. 9, 1999, the entire contents of which are incorporated herein by reference.

BACKGROUND OF THE INVENTION

The present invention relates to a liquid crystal display device and more particularly to a liquid crystal display device having columnar spacers that allow the cell gap formed between a pair of substrates to be made uniform.

In recent years, flat-panel display devices, typically liquid crystal display devices, have been used as display devices for personal computers and word processors because of their features of small thickness, light weight, and low power dissipation. Among them, active-matrix liquid crystal display devices in which a switching element is electrically connected to each pixel electrode have been intensively studied and developed because they provide good images with little crosstalk between adjacent pixels.

Such active-matrix liquid crystal display devices have spacers for forming a cell gap between a pair of substrates. For example, the spacers are provided on the counter substrate having red, green and blue color filter layers. That is, the spacers are formed by stacking color filter layers on a light shield layer that prevents wire pattern, such as scanning lines and signal lines around pixel electrodes, and switching elements from exposure to light.

Thus, if the spacers are formed on the light shield layer for concealing alignment failures due to differences in level around the switching elements and near the wire patterns, the alignment failures near the spacers are difficult to be exposed. For this reason, higher-quality images can be provided than in liquid crystal display devices in which the cell gap is formed by scattering spherical spacers on a substrate.

However, when the spacers are formed from stacked color filter layers on the light shield layer, counter electrode arranged on the color filter layers will cover the spacers as well. Such counter electrode protrude from the major surface of the counter substrate toward the array substrate side. For this reason, the counter electrode that cover the spacers become easy to be short-circuited to the pixel electrodes, wire patterns and switching elements on the array substrate side.

The color filter layers that form such a spacer are each set to a given thickness to allow light to pass through at a given transmission factor. Thus, the spacer formed by stacking the color filter layers can be formed only at a given height and hence suffers from a limitation on the freedom of its height. For this reason, it is difficult to apply spacers of such a structure to a liquid crystal display device with an arbitrary cell gap.

On the other hand, a liquid crystal display device having a columnar spacer formed of resin on color filter layers has been proposed. In such a liquid crystal display device, no color filter layer is located in the peripheral area around the display area, i.e., the outside area defined by a sealing material. If, therefore, columnar spacers of the same height as those in the display area are formed in the peripheral area, then the spacers in the peripheral area will fall the thickness of the color filter layers short of those in the display area. Therefore, local nonuniformity occurs in the cell gap. The nonuniformity of the gap also influences the display area and may cause image display failures.

In recent years, as the demand for small-sized display devices increases, the width of the peripheral area around the display area tends to decrease. With small-sized liquid crystal display devices, the gap nonuniformity in the peripheral area further significantly affects the display area.

Thus, the conventional spacer structure may result in reduced manufacturing yields because of short-circuiting between the counter substrate and the array substrate, the limited freedom of the spacer's height, and display failures due to the gap nonuniformity.

BRIEF SUMMARY OF THE INVENTION

An object of the present invention is to provide a liquid crystal display device capable of permitting the manufacturing yield to be prevented from lowering and good images to be displayed.

Another object of the present invention is to provide a method of manufacturing a liquid crystal display device capable of permitting the manufacturing yield to be prevented from lowering and good images to be displayed.

According to the present invention there is provided a liquid crystal display device comprising: a first substrate having a plurality of pixel electrodes; a second substrate having a counter electrode which is opposed to the pixel electrodes; and an optical modulating layer sandwiched between the first and second substrates, wherein a display area for modulating light transmitted through the optical modulating layer to display images has color filter layers each of which allows a predetermined color of light to pass through, and a peripheral area around the display area has a color filter layer and a column-shaped spacer which is stacked on the color filter layer and forms a gap between the first and second substrates.

According to the present invention there is provided a method of manufacturing a liquid crystal display device comprising the step of forming a first substrate having pixel electrodes, the step of forming a second substrate having a counter electrode, and the step of sealing in an optical modulating layer between the first and second substrates, wherein the step of forming a second substrate includes a substep of forming color filter layers each of which allows a predetermined color of light to pass through on an insulating substrate, a substep of forming the counter electrode to cover the color filter layers in a display area adapted to display images by modulating light transmitted through the optical modulating layer, a substep of forming column-shaped spacers on the counter electrode, and a substep of forming a column-shaped spacer to cover a color filter layer formed in a peripheral area around the display area.

According to the liquid crystal display device of the present invention, the spacer in the peripheral area is formed on a dummy color filter layer, which allows the cell gap to be made uniform over the display area and the peripheral area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of a liquid crystal display device of the present invention will be described below with reference to the accompanying drawings.

Figure 1:
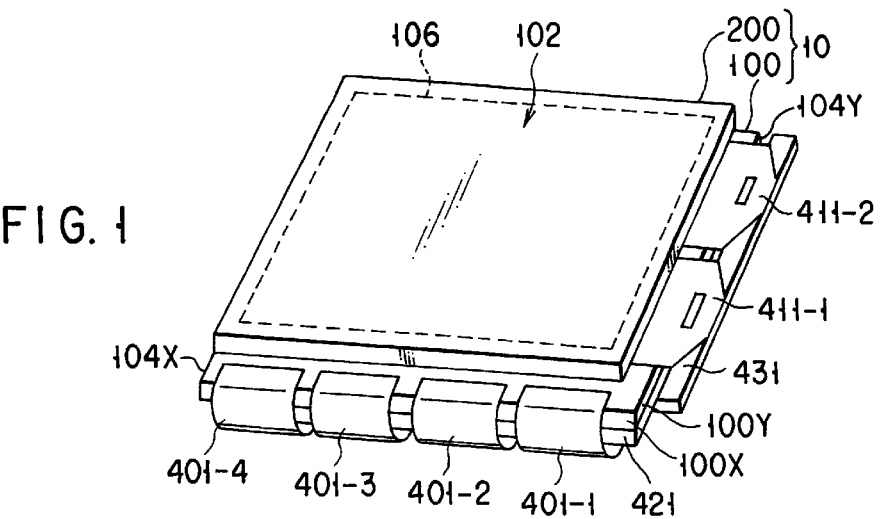
FIG. 1 is a schematic perspective view of a liquid crystal display panel applied to a liquid crystal display device of the present invention.

Referring to FIG. 1 there is illustrated in perspective view a schematic of a liquid crystal display panel applied to the liquid crystal display device of the present invention.

The liquid crystal display device according to an embodiment of the present invention is a transmissive active-matrix liquid crystal display device and has such a liquid crystal display panel 10 as shown in FIG. 1.

As shown in FIG. 1, the liquid-crystal display panel has an array substrate 100 as a first substrate, a counter substrate 200 as a second substrate which is opposed to the array substrate 100, and a liquid crystal material that forms an optical modulating layer disposed between the array substrate 100 and the counter substrate 200. In such a liquid crystal display panel 10, a display area 102 adapted to display images is formed in the area surrounded with a sealant 106 by which the array substrate 100 and the counter substrate 200 are pasted together. Peripheral areas 104X and 104Y are formed in areas outside the display area 102 and have various wire patterns drawn out of the display area 102.

Figure 2:
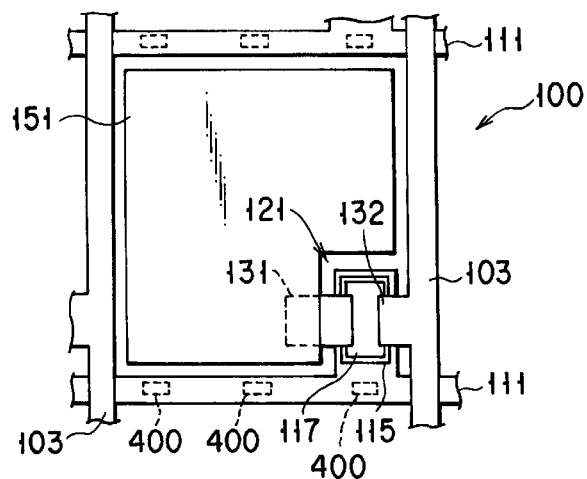
FIG. 2 is a schematic plan view of the array substrate of the liquid crystal display panel shown in FIG. 1.
Figure 3:
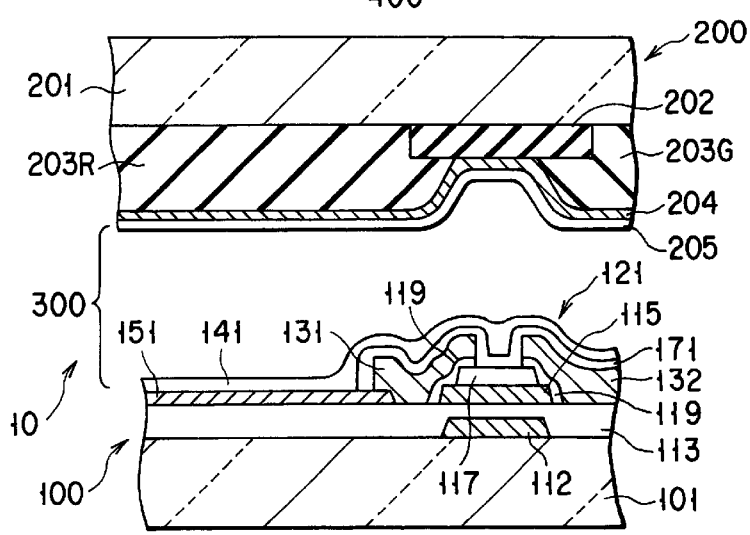
FIG. 3 is a schematic sectional area of the display area of the liquid crystal display panel shown in FIG. 1.

The display area 102 of the array substrate 100 has, as shown in FIGS. 2 and 3, pixel electrodes 151, scanning lines 111, signal lines 103, and thin-film transistors (TFT) 121 arranged on a transparent insulting substrate 101, for example, a glass substrate of 0.7 mm thick. The m×n pixel electrodes 151 are arranged in a matrix form on the glass substrate 101. The m scanning lines 111 are formed along the row direction of the pixel electrodes 151. The n signal lines 111 are formed along the column direction of the pixel electrodes 151. Each of the m×n TFTs 121, serving as switching elements, correspond to a respective one of the m×n pixel electrodes 151 and is located in the vicinity of the intersection of a scanning line 111 and a signal line 103.

The scanning lines 111 are made of a material of low resistivity, such as aluminum or a molybdenum-tungsten alloy. The signal lines 103 are made of a material of low resistivity, such as aluminum. The signal lines 103 are located on a multilevel insulating film 113, consisting of silicon oxide and silicon nitride, formed on the glass substrate 101.

The pixel electrodes 151 are made of a transparent conductive material such as indium/tin oxide (ITO).

Each of the TFTs 121 uses a protruding portion of the corresponding scanning line 111 as its gate electrode 112 and has a semiconductive film 115 formed on the gate insulating film 113 formed on the gate electrode 112. The semiconductive film 115 is formed of an amorphous silicon film, i.e., a-Si:H film, and covered with a channel protective film 117 of silicon nitride.

The semiconductive film 115 is electrically connected with the corresponding pixel electrode 151 through a low-resistivity semiconductive film 119 of n+a-Si:H and a source electrode 131. The semiconductive film 115 is also electrically connected with the corresponding signal line 103 through the low-resistivity semiconductive film 119 and a drain electrode 132. The channel protective film 117, the source electrode 131 and the drain electrode 132 of the TFT 121 are covered with a protective film 171 consisting of an insulating film of, say, silicon nitride.

The surface of the array substrate 100 thus formed is covered with an alignment film 141 that aligns the liquid-crystal elements in a liquid crystal material 300 sealed in between the array substrate 100 and the counter substrate 200.

With the liquid crystal display panel 100, to reduce the outside dimensions, particularly the frame size, of the liquid crystal display device, the signal lines are drawn out only to the side of the first edge 100X of the peripheral area 104X of the array substrate 100 though not shown in detail in FIG. 1. The signal lines are connected by anisotropic conductive adhesive to X-TABs 401-1, -2, -3 and -4 for supplying video data to them on the side of the first edge 100X.

The scanning lines are also drawn out only to the side of that second edge 100Y of the peripheral area 104X of the array substrate 100 which is perpendicular to the first edge 100X. The scanning lines are connected by anisotropic conductive adhesive to Y-TABs 411-1, -2, -3 and -4 for supplying scan pulses to them on the side of the second edge 100Y.

The X-TABs 401-1, -2, -3 and -4 are folded back to the rear side of the liquid crystal panel 10 and connected by anisotropic conductive adhesive to an X-TAB control circuit board 421 attached to the rear side of the panel.

The Y-TABs 411-1, -2, -3 and -4 are connected by anisotropic conductive adhesive to a Y-TAB control circuit board 431 placed at the side of the liquid crystal display panel 10.

As shown in FIG. 3, in the display area 102 of the counter substrate 200, a light shield layer 202 is formed on the surface of a transparent insulating substrate 201, for example, a glass substrate of 0.7 mm in thickness. The light shield layer 202 is adapted to prevent non-pixel portions on the array substrate 100 from exposure to light. The non-pixel portions include wire patterns of signal lines and scanning lines, TFT elements, and spaces between pixel electrodes and interconnections. The light shield layer 202 consists of a single or composite layer of, say, chromium oxide.

The counter substrate 200 is further provided with color filter layers 203R, 203G and 203B which are colored red, green and blue, respectively. Each color filter layer is formed in a corresponding one of red (R)-, green (G)- and blue (B)-pixel areas on the glass substrate 201 that is opposed to the corresponding pixel electrode 151. These color filter layers are formed of resins dispersed with pigments of the respective colors. The color filter layers 203R, 203G and 203B respectively allow red, green and blue light rays to pass through. When the color filter layers 203R, 203G and 203B are formed on the side of the counter substrate 200, each of them allows only a corresponding one of red, green and blue components of light passed through the liquid crystal material 300 to pass through.

The surface of the color filter layers is covered with a counter electrode 204 consisting of a transparent conductive material such as ITO. The surface of the counter electrode 204 is covered with an alignment film 205 that aligns the liquid crystal elements of the liquid crystal material 300 sealed in between the substrates 100 and 200.

The counter electrode 204 produces a potential difference with respect to the pixel electrode 151 to control the alignment of the liquid-crystal elements contained in the liquid crystal material 300. The light rays passed through the alignment controlled liquid crystal material 300 are modulated to form a display image. Covering the color filter layers with the counter electrode 204 of ITO prevents ionic impurities that disrupt the arrangement of the liquid-crystal elements from leaching from the color filter layers into the liquid crystal material.

That is, the liquid crystal panel 10 acts as a capacitor in which the liquid crystal material 300 as a dielectric is sandwiched between the pixel electrode 151 and the counter electrode 204. Even in the case where a signal for producing a potential difference between the electrodes is intermittently applied, the potential difference is held for a fixed period of time owing to the capacitor structure. Thus, the aligned state of the liquid-crystal elements controlled by the potential difference between the electrodes is also held.

The pigments contained in the color filter layers contain lots of metallic substances, i.e., ionic impurities, that lower the resistivity of the liquid crystal material 300. The ionic impurities leaching into the liquid crystal material 300 lower its resistivity, making it difficult to hold the aligned state of the liquid-crystal elements for a fixed period of time. Thus, display failures may occur.

Covering the color filter layers with the counter electrode 204 is effective in preventing the ionic impurities from leaching into the liquid crystal material, allowing the prevention of occurrence of display failures.

Figure 4:
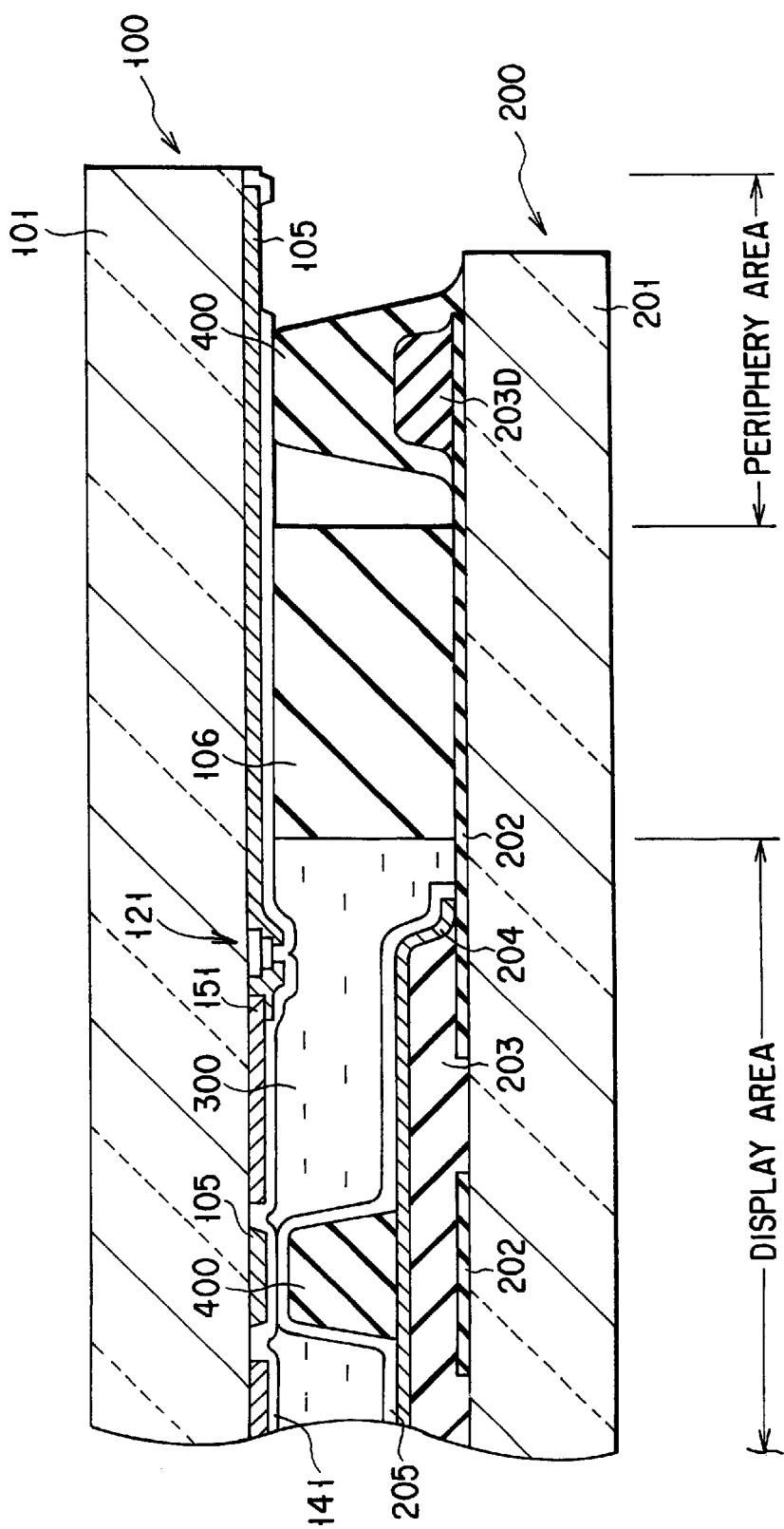
FIG. 4 is a schematic sectional area of the display area and the peripheral area of the liquid crystal display panel shown in FIG. 1.

To form a given width of cell gap between the array substrate 100 and the counter substrate 200, spacers 400 are arranged on the non-pixel portions in the display area 102 of the counter substrate 200 and on the frame portion of the peripheral areas 104X and 104Y as shown in FIGS. 2 and 4. These spacers 400 are each formed of a single layer of transparent resin formed in the shape of a column which is 10 $\mu$m square and 5 $\mu$m high, for example. Thus, the cell gap between the array substrate 100 and the counter substrate 200 is set to about 5 $\mu$m.

The spacers 400 are formed of a polymeric material containing no low-resistivity substance, that is, a high-resistivity material such as an acrylic resin.

The liquid crystal display panel 10 has polarizing plates (not show) on its first and second sides, i.e., on the outside surfaces of the glass substrates 101 and 201. These polarizing plates are arranged so that their respective plane of polarization is optimized according to the display mode of the liquid crystal display device and the twist angle of the liquid crystal material.

The spacers 400 used in the liquid crystal display device are formed on the side of the counter substrate 200 as shown in FIG. 4. In the display area 101 the spacers 400 are each formed on the counter electrode 204 of a given thickness formed above the light shield layer 202 formed on the glass substrate 201 with the color filter layer 203 of a given thickness interposed therebetween.

The counter substrate 200 for the display area 102 are formed in the following manner:

The light shield film 202 is first formed in selected areas on the insulating substrate 201. Then, the color filter layers 203 are formed on pixel areas on the insulating substrate 201, including the areas where the light shield film 202 is formed. Subsequently, the counter electrode 204 is formed to cover the color filter layer 203. Next, the column-shaped spacers 400 are formed on that portion of the counter electrode 204 which corresponds to the light shield film 202. Finally, the alignment film 205 is formed to cover the counter electrode 204 and the spacer 400. In this manner, the counter substrate 200 for the display area is formed.

In the peripheral area 104, on the other hand, the spacer 400 is provided on a dummy color filter layer 203D stacked on the light shield layer 202 formed on the glass substrate 201. The dummy color filter layer 203D is formed in the same process and at substantially the same thickness as the color filter layer 203 in the display area 102.

The spacer 400 in the peripheral area 104 is located so that it is opposed to the area of the array substrate 100 in which wire patterns 105 of scanning lines and signal lines are formed when the array substrate 100 and the counter substrate 200 are pasted together.

The counter substrate 200 in the peripheral area 104 is formed in the following manner:

First, the light shield film 202 is formed on the selected area of the insulating substrate 201. Then, the dummy color filter 203 is formed on the light shield layer 203. The dummy color filter may be of any one of red, green and blue. Finally, the column-shaped spacer 400 is formed to cover the dummy color filter layer 203D. In this manner, the counter substrate 200 for the peripheral area 104 is formed.

The thickness of the counter electrode 204 in the display area 102 is 50 nm, which is negligibly small in comparison with the thickness, 2 $\mu$m, of the color filter layer 203. Therefore, the cell gap in the peripheral area 104 is substantially equal to that in the display area 102. For this reason, if the spacers 400 are formed at the same height in all the area of the counter substrate 200, then the gap uniformity will be achieved over the entire area (the display area 102 and the peripheral area 104). It therefore becomes possible to prevent the occurrence of display failures due to gap nonuniformity.

In addition, it is possible to form the spacers 400 in the display and peripheral areas 102 and 104 from the same material. The spacers 400 can therefore be formed in the same process and under the same conditions with no increase in the number of manufacturing steps.

In the peripheral area 104, the spacer 400 is formed to cover the dummy color filter layer 203D. The spacer 400 is made of a high-resistivity polymeric material with no low-resistivity substance. For this reason, the spacer 400 can prevent the ionic impurities from leaching from the color filter layer 203D in the manufacturing process of the liquid crystal display panel 10, thus making it possible to prevent the occurrence of display failures.

In the structure having such spacers, unlike the structure in which color filter layers are stacked to form spacers, the counter electrode 204 never protrudes toward the array substrate 100. It therefore becomes possible to prevent the occurrence of short-circuiting between the counter electrode 204 on the counter substrate side and the wire patterns on the array substrate side.

In the structure having such spacers, unlike the structure in which color filter layers with predetermined thickness are stacked to form spacers, the spacers are allowed to have freedom of height. That is, the spacers are formed of a single layer of resin. Thus, simply adjusting the thickness of the resin allows the formation of spacers for liquid crystal display devices which are not subject to cell gap limitations.

With such a structure, it is possible to make the height of spacers 400 differ locally. For example, when the thickness of each film in the display area 102 is relatively large and the cell gap in the display area 102 is smaller than that in the peripheral area 104, the height of spacers 400 in the peripheral area 104 is made larger than in the display area 102. Thereby, the gap uniformity can be achieved over the entire area. That is, such a structure is applicable to liquid crystal display devices which are not subject to cell gap limitations.

Therefore, the problem of short-circuiting of the counter substrates, the problem of the limited freedom of the spacer's height and the problem of display failures due to gap nonuniformity can be solved to improve the manufacturing yield.

In the above embodiment, the color filter layers and the spacers are formed on the counter substrate side. With the color filter on array structure such that each pixel electrode is formed on a color filter layer, they may be formed on the array substrate side.

According to the present invention, as described above in detail, a liquid crystal display device and a method of manufacturing the same can be provided which permits the manufacturing yield to be prevented from lowering and good images to be displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a first substrate having a plurality of pixel electrodes;
   a second substrate pasted with the first substrate by a sealant and having a counter electrode which is opposed to the pixel electrodes; and
   an optical modulating layer sandwiched between the first and second substrates,
   wherein each of the first and second substrates has an extending portion extending outward of the sealant,
   a display area surrounded with the sealant for modulating light transmitted through the optical modulating layer to display images has color filter layers each of which allows a predetermined color of light to pass through,
   a peripheral area divided from the display area by the sealant and formed in the extending portions of the first and second substrates has a color filter layer and a column-shaped spacer which is stacked on the color filter layer to form a gap between the extending portions of the first and second substrates, and
   the display area has spacers formed on the counter electrode to thereby form a gap substantially equal to that in the peripheral area.

2. The liquid crystal display device according to claim 1, wherein the color filter layer in the peripheral area is covered with the spacer.

3. The liquid crystal display device according to claim 1, wherein the color filter layers and the spacer are provided on the second substrate.

4. The liquid crystal display device according to claim 1, wherein the color filter layers in the display area are covered with the counter electrode so that they are not in contact with the optical modulating layer.

5. The liquid crystal display device according to claim 1, wherein the spacer is formed of a resin.

6. The liquid crystal display device according to claim 1, wherein the spacer in the peripheral area is formed of the same material as the spacers in the display area.

7. A method of manufacturing a liquid crystal display device comprising the step of forming a first substrate having pixel electrodes, the step of forming a second substrate having a counter electrode, and the step of sealing in an optical modulating layer between the first and second substrates, wherein the step of forming a second substrate includes a substep of forming color filter layers each of which allows a predetermined color of light to pass through on an insulating substrate, a substep of forming the counter electrode to cover the color filter layers in a display area adapted to display images by modulating light transmitted through the optical modulating layer, a substep of forming column-shaped spacers on the counter electrode, and a substep of forming a column-shaped spacer to cover a color filter layer formed in a peripheral area around the display area.

8. A method of manufacturing the liquid crystal display device according to claim 7, wherein the spacer in the peripheral area is formed in the same process as the spacers in the display area.

* * * * *